March 29, 1966 J. M. REECE 3,243,608

ZENER DIODE FREQUENCY MULTIPLIER

Filed June 15, 1964

INVENTOR

JOHN M. REECE

BY

AGENT

ATTORNEY

United States Patent Office 3,243,608

Patented Mar. 29, 1966

3,243,608

ZENER DIODE FREQUENCY MULTIPLIER

John M. Reece, Accokeek, Md., assignor to the United States of America as represented by the Secretary of the Navy Filed June 15, 1964, Ser. No. 375,404

5 Claims. (Cl. 307—88.5)

The invention described herein may be manufactured and used by or for the Government of the United States of America for governmental purposes without the payment of any royalties thereon or therefor.

This invention relates to harmonic generators and more particularly to a frequency multiplying circuit which includes a zener, backward or similarly non-linear diode and which preferably operates to provide output signals in the 1–100 mc. frequency range. This invention has particular utility in radar systems.

Several different methods have been utilized in obtaining higher order harmonic frequencies below 100 mc. One method is to pass either a square wave or a saw tooth wave through an electrical system designed to filter out the desired component. This method provides extremely weak higher harmonic signals, since in the series expansion of such waves the amplitude of the nth harmonic is proportional to $E/n$, where E is the amplitude of the fundamental frequency. Another method is to energize, by Class C drive, several tank and filter circuits tuned to produce different lower harmonic signals, such as the second or third, and then to multiply and heterodyne these lower harmonic signals to obtain, after further filtering, the higher harmonic desired. Depending upon the harmonic desired, several heterodyning stages may be required. This method is extremely inefficient and requires complex circuitry.

In contrast, this invention utilizes a very simple circuit to directly convert the fundamental frequency input signal into a higher harmonic frequency output signal. In addition to the obvious advantages of lower cost and simplicity of circuitry, as well as higher operating efficiency, this invention also has the advantage of being simple to operate.

It is, therefore, an object of the present invention to provide a harmonic generator circuit which includes a zener, backward or similarly non-linear diode.

A further object of the invention is to provide apparatus which generates harmonic frequencies in the 1–100 mc. frequency range.

Yet another object of the present invention is the provision of simple, efficient circuitry which is easy to operate and produces higher harmonic frequencies.

A still further object of this invention is the provision of means which are easy to operate, which require relatively few components that are inexpensive and easily assembled and include a zener, backward or similarly non-linear diode and which can produce higher harmonic signals in the 1–100 mc. frequency range.

With these and other objects in view, as will hereinafter more fully appear, and which will be more particularly pointed out in the appended claims, reference is now made to the following description taken in connection with the accompanying drawings in which:

Figure 1:
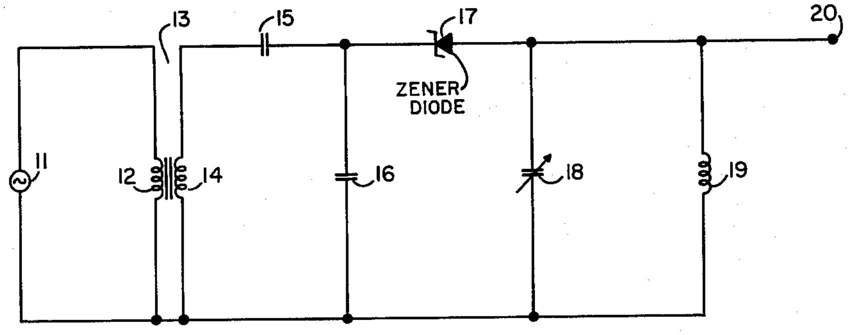
FIG. 1 is a circuit diagram of an embodiment of the invention.

Referring now to the drawings, there is shown in FIG. 1 a circuit diagram of an embodiment of the invention. The fundamental frequency input has, for the sake of illustration, been shown as a sine wave generator 11 connected to energize the input or primary winding 12 of transformer 13. However, the input source is not a part of this invention and the components shown are merely symbolic of any source which supplies the fundamental frequency signal, a harmonic of which is desired.

The output or secondary winding 14 of transformer 13 is connected across capacitors 15 and 16, the junction of which is connected to one side of diode 17 which is preferably a zener, backward or similarly non-linear diode. The other end of diode 17 is connected to a tank circuit consisting of adjustable capacitor 18 and coil 19 which are connected in parallel to the junction of winding 14 and capacitor 16.

Capacitor 16, which improves the performance of the circuit of FIG. 1, is not absolutely necessary and may be omitted in certain circumstances, if desired.

The frequency of the output signal, which is obtained at terminal 20, is determined by the adjustment of capacitor 18. The output waveform is rich in the harmonic frequency to which the tank circuit is tuned, this tuned frequency ordinarily being many db larger than other frequency components. In many instances the output signal, which typically could be at a frequency 50 times greater than the frequency from source 11, will be sufficiently pure to be used directly. However, in some instances, additional filtering may be required to remove the unwanted frequency components.

Figure 2:
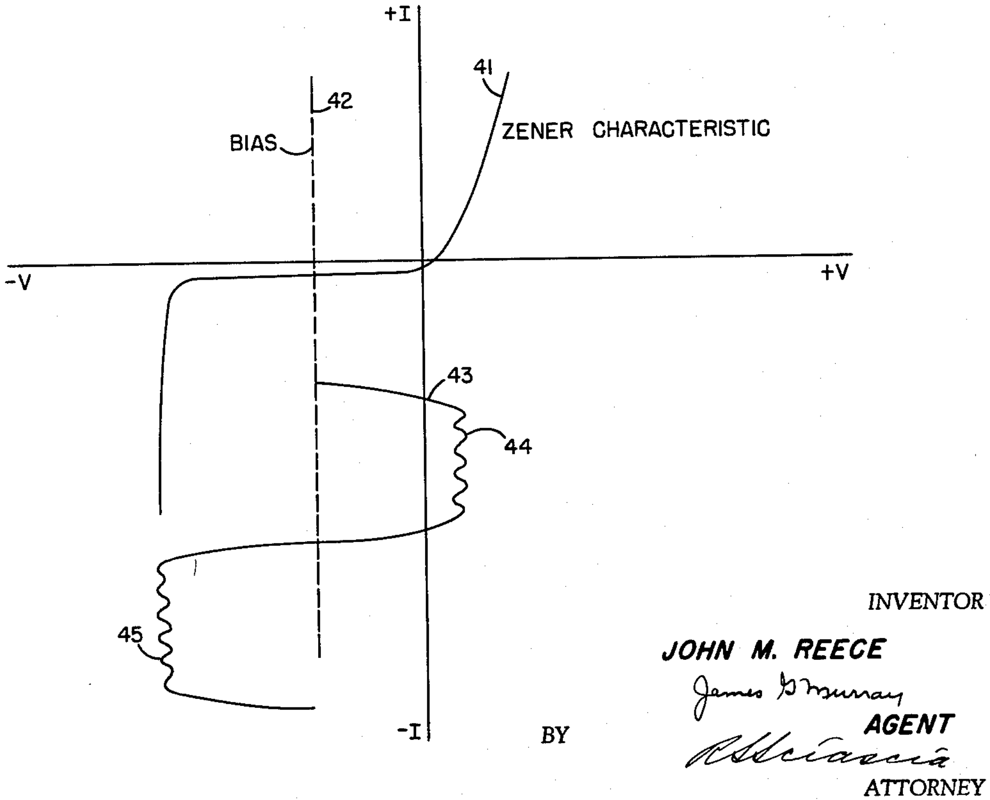
FIG. 2 is a plot of several operational curves which are helpful in understanding the invention.

FIG. 2 is helpful in understanding the operation of the circuit in FIG. 1. In FIG. 2 the curve 41 is the familiar voltage-current characteristic curve for a non-linear avalanche or zener type diode. Initially the diode 17 conducts in its forward direction for a longer portion of the fundamental frequency drive 43 than in its back direction. This results in a bias voltage build up across capacitor 15 which eventually reaches a value 42 approximately midway between the diode back conduction and forward conduction voltages.

The surge of current through diode 17 during both peaks of the fundamental drive causes the tuned tank circuit 18, 19 to ring at the tuned harmonic frequency. The ringing voltage causes the diode 17 to switch at the harmonic rate and provides a drive to the tank at its resonant harmonic frequency.

It is of interest to note that an output signal of significant amplitude is obtained at terminal 20 only if tank circuit 18, 19 is tuned to a harmonic frequency of the input frequency. For example, if generator 11 produces a 1 mc. input signal, a signal of significant amplitude is present at terminal 20 if the tank circuit 18, 19 is tuned approximately to 47 mc. or 48 mc. but no significant output signal is obtained if the tank circuit is tuned to 47.5 mc.

It is also of interest to note that the ringing of the tank circuit 18, 19 switches the diode between the conducting and non-conducting states, as illustrated in FIG. 2 in areas 44 and 45 of the fundamental driving voltage 43. This switching occurs at the resonant frequency of the tank circuit and allows energy to almost continuously enter the tank circuit, and thereby maintain the resonant oscillations, during both directional swings of the fundamental drive voltage. When compared to intermittent type C amplifier excitation, the almost continuous excitation of the tank circuit of this invention is highly advantageous because of much higher efficiency and the avoidance of output signal decay between the intermittent energizations.

The invention described is easily used. Presuming that the operator knows the approximate input frequency and the harmonic frequency desired, it is only necessary to manipulate the single control of capacitor 18 to tune the tank circuit to the desired harmonic. The adjustment control of capacitor 18 can, of course, include calibrated indicia showing the operator to what frequency the tank circuit is tuned.

Although the disclosed circuit is operable over a much wider frequency spectrum, because of the lack of comparable devices it has been found to be of particular usefulness when producing output signals in the 1–100 mc. frequency range.

It will be apparent that there has been disclosed a circuit which includes a zener, backward or similarly non-linear diode, which is easily operated, which functions to generate higher harmonic frequencies and which has particular utility when producing output signals in the 1–100 mc. frequency range.

It should be understood, of course, that the foregoing disclosure relates to only an embodiment of the invention and that numerous modifications or alterations may be made therein without departing from the spirit and the scope of the invention as set forth in the appended claims.

What is claimed and desired to be secured by Letters Patent of the United States is:

1. A harmonic generator comprising:
a Zener diode,
means for applying a steady bias voltage to said diode,
means for applying a fundamental frequency alternating current signal to one end of said diode, and
adjustable tank circuit means coupled to the other end of said diode for providing an output signal when said Zener diode switches between its conducting and non-conducting states during polarity swings of said fundamental signal when said tank circuit is tuned to resonate at a frequency which is a harmonic of said fundamental frequency.

2. A harmonic generator as set forth in claim 1 wherein the means for applying a fundamental frequency alternating current signal includes a transformer.

3. A harmonic generator as set forth in claim 2 wherein the means for applying a steady bias voltage to said diode includes two capacitors connected in series across the secondary of said transformer.

4. A harmonic generator as set forth in claim 3 wherein said one end of said Zener diode is connected to the junction of said two capacitors and the steady bias voltage is of a value approximately midway between the forward and backward conduction voltage of said diode.

5. A harmonic generator comprising:
an input transformer having primary and secondary windings,
first and second capacitors connected in series across said secondary winding,
a Zener diode connected at one end between said first and second capacitors and
an adjustable capacitor and a coil connected in parallel between the other end of said Zener diode and the junction of said second capacitor and said secondary winding.

References Cited by the Examiner

UNITED STATES PATENTS

| | | | |
|---|---|---|---|
| 2,809,239 | 10/1957 | Nielsen | 329—150 X |
| 2,936,420 | 5/1960 | Tyler | 328—16 X |
| 3,060,364 | 10/1962 | Holcomb | 307—88.5 X |
| 3,076,133 | 1/1963 | Holcomb | 307—88.5 X |
| 3,161,816 | 12/1964 | Holcomb | 307—88.5 X |
| 3,188,496 | 6/1965 | Ballard | 328—16 X |

ARTHUR GAUSS, *Primary Examiner.*

I. C. EDELL, *Assistant Examiner.*